Patented June 29, 1954

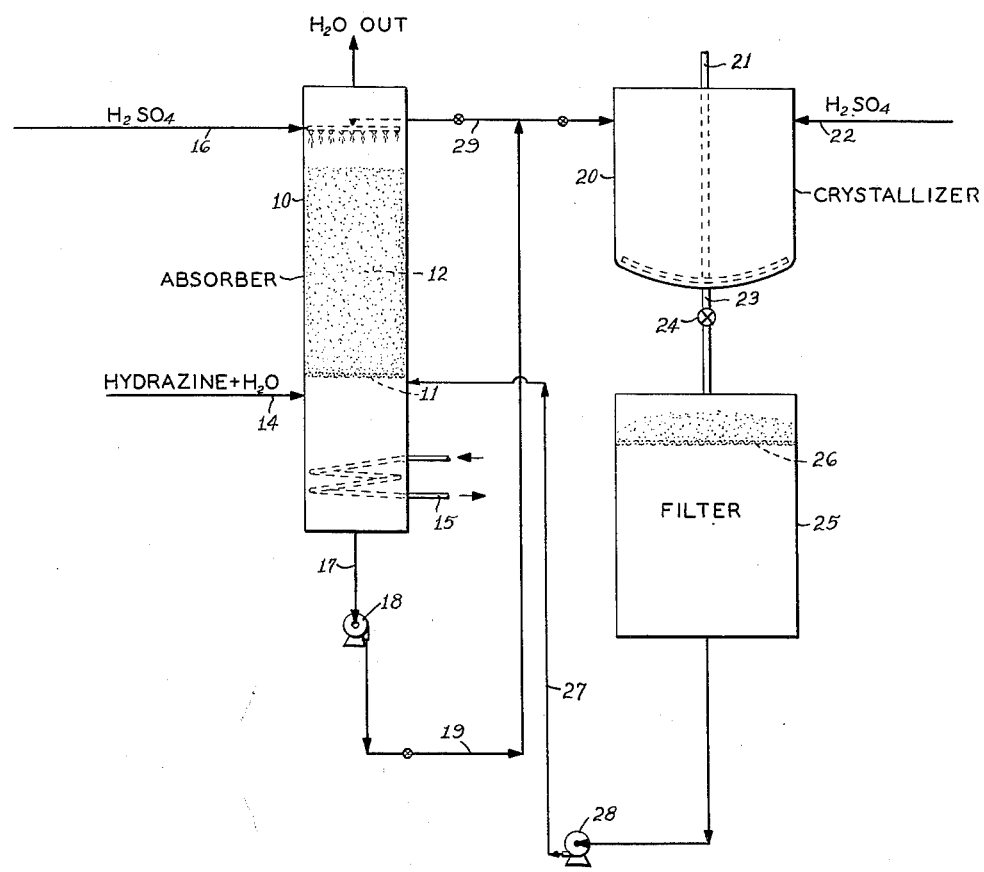

2,682,446

UNITED STATES PATENT OFFICE 2,682,446

PROCESS FOR MAKING HYDRAZINE SULFATE

John E. Weiler, Niagara Falls, N. Y., assignor to Mathieson Chemical Corporation, a corporation of Virginia Application October 23, 1947, Serial No. 781,645

3 Claims. (Cl. 23—117)

My invention relates to a practical and economical method for the manufacture of hydrazine sulfate, $N_2H_4.H_2SO_4$, a compound particularly valuable as an intermediate in the production of anhydrous hydrazine which is widely employed as a reducing agent, and, in liquid ammonia solution, as a nitridizing agent.

My process contemplates as the starting material an aqueous solution of hydrazine such as that obtained on the Raschig synthesis,

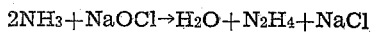
$$2NH_3 + NaOCl \rightarrow H_2O + N_2H_4 + NaCl$$

following the removal of excess ammonia by distillation and the separation of the salt by evaporation and crystallization. Such solution generally consists of about 1.5–2% hydrazine and about 98% water and is conventionally passed as a vapor to a series of fractionating columns yielding as a final product a concentrate containing about 91% hydrazine hydrate or about 58% hydrazine on an anhydrous basis. The fractionation is accompanied by overhead and decomposition losses of hydrazine frequently amounting to as much as 25%; and is further disadvantageous, apart from the fact that anhydrous hydrazine is not produced, in the large amount of steam required to provide the high reflux ratios necessary for the degree of water separation indicated.

In accordance with my invention, I pass the solution of hydrazine, the 1.5–2% solution in the case of the Raschig synthesis, as a vapor, into an absorbent solution, the same being a solution of dihydrazine sulfate, $(N_2H_4)_2.H_2SO_4$, having a concentration between 10 and 90%, most suitably between 30 and 50%, maintained at a temperature not permitting of the condensation of water vapor.

As a consequence of additions of sulfuric acid, the hydrazine removed from the vapor mixture by the absorbent solution is converted to dihydrazine sulfate. I convert this dihydrazine sulfate and the dihydrazine sulfate originally present in the solution to hydrazine sulfate by adding additional acid to the solution. Much of the sulfate promptly precipitates as it is relatively much less water soluble than the dihydrazine sulfate. At 60° C., for example, the solubility of dihydrazine sulfate is 84.7 grams per 100 grams of saturated solution, whereas at such temperature the solubility of hydrazine sulfate is only 8.32 grams per 100 grams of saturated solution.

The precipitated sulfate is separated by filtration and the filtrate recycled to the absorbent solution. Upon introduction of the dried sulfate into an excess of liquid ammonia, hydrazine and ammonium sulfate are formed. The liquid ammonia solution of hydrazine on separation from the solid ammonium sulfate may be used as such, as in a nitridizing operation, or the solution may be subjected to an evaporation treatment to obtain anhydrous hydrazine free of ammonia. In my copending application Serial No. 784,809, filed November 8, 1947, I describe and claim a system of apparatus which may be used, with advantage, in effecting the reconversion of hydrazine sulfate to hydrazine with liquid ammonia.

The process of my present invention and its application to the Raschig synthesis will be better understood by reference to the accompanying simplified diagram. It should here be made clear that while the process is particularly valuable as an adjunct of the Raschig synthesis, it is not limited to an aqueous solution of hydrazine derived by reaction of ammonia and sodium hypochlorite, since any aqueous hydrazine solution may be employed as the starting material.

In the drawing, numeral 10 denotes a column provided with a grid 11, supporting a packing material 12, as glass beads, porcelain Raschig rings, or the like resistant to acid at the temperature prevailing within the column. Into the column is introduced via line 14, an essentially salt-free vapor mixture consisting, for example, of 1.5 parts of hydrazine and 98.5 parts of water. A solution of dihydrazine sulfate in the section of the column below the grid is maintained at a temperature avoiding absorption of the water vapor in the vapor mixture by a heating element 15. Accordingly, the water vapor travels upwardly through the column against downwardly flowing aqueous sulfuric acid admitted via line 16, the quantity of acid admitted being such that the absorbent solution, i. e. the solution of dihydrazine sulfate, is kept at all times at a pH within the range 3.5 to 5.5. Substantially all of the hydrazine which would otherwise be carried out of the column by the water vapor is recovered by the downwardly flowing aqueous acid.

A solution of dihydrazine sulfate having a concentration usually of about 40%, comprising dihydrazine sulfate derived by reaction of the hydrazine introduced via line 14 and the acid charged to maintain the absorbent solution at a pH within the prescribed range, is withdrawn from the bottom of the column through line 17 by pump 18 and is forced via valve controlled line 19 to a vessel 20, legended "crystallizer" in the drawing, equipped with a stirrer 21. Acid introduced into the vessel through line 22 converts the dihydrazine sulfate in the solution to hydrazine sulfate, which, as has been explained, is relatively much less water soluble. A slurry in which the aqueous phase represents a saturated solution of hydrazine sulfate and in which the solid phase consists of hydrazine sulfate is withdrawn from vessel 20 through pipe 23, controlled by valve 24, and is charged to a filter 25 comprising a filter screen 26 on which the solid phase of the slurry collects and from which it is periodically removed, as necessary.

The filtrate from the filtration operation, consisting of a saturated solution of hydrazine sulfate, is conveyed via line 27, having a pump 28 therein, to the bottom of column 10 where, because of the pH at which the absorbent solution is maintained, the sulfate is reconverted to dihydrazine sulfate. Valve controlled line 29 connecting with line 19 extending between column 10 and unit 20 is provided in order that part or all of the bottom product of the column may be recycled, when necessary, to increase the concentration of the solution introduced into the crystallizer.

In a typical commercial scale operation, carried out over a twenty-four hour period in accordance with the drawing, approximately 10,000 pounds of water vapor containing 1.5% hydrazine and about 240 pounds of 100% sulfuric acid, which may be added preferably as 98% acid or as more dilute acid provided sufficient heating capacity is furnished to evaporate additional water, are introduced into the absorber. About 400 pounds of dihydrazine sulfate are removed from the absorber for charging to the crystallizer with an additional 240 pounds of acid. The yield of moist, neutral hydrazine sulfate obtained on the filtration is around 600 pounds.

I claim:

1. Process comprising introducing a vapor mixture of hydrazine and water into a solution of dihydrazine sulfate and water containing from 10–90% dihydrazine sulfate maintained at a pH within the range 3.5 to 5.5 and at a temperature avoiding condensation of water vapor, precipitating hydrazine sulfate from the solution by the addition thereto of sulfuric acid, and separating such of the sulfate as precipitates.

2. A process according to claim 1 where the concentration of dihydrazine sulfate in the solution into which the vapor mixture is introduced is maintained between 30 and 50% and where the precipitated hydrazine sulfate is separated by filtration and the filtrate is recycled to the dihydrazine sulfate solution.

3. A process according to claim 2 wherein the sulfuric acid employed in forming the dihydrazine sulfate is previously intimately contacted with the water vapors leaving the system.

References Cited in the file of this patent

Mellor: Inorganic and Theoretical Chemistry, vol. 8, pages 325 and 326. Pub. by Longmans, Green and Co., London, 1928.